United States Patent [19]

Scrace

[11] Patent Number: 4,660,767
[45] Date of Patent: Apr. 28, 1987

[54] VECTORABLE EXHAUST NOZZLE FOR GAS TURBINE ENGINES

[75] Inventor: Harold A. Scrace, Bristol, England

[73] Assignee: Rolls-Royce, London, England

[21] Appl. No.: 764,012

[22] Filed: Aug. 9, 1985

[30] Foreign Application Priority Data

Aug. 16, 1984 [GB] United Kingdom ............... 8420798

[51] Int. Cl.$^4$ ............................................. F02K 1/78
[52] U.S. Cl. ............................ 239/265.35; 244/12.5; 244/52
[58] Field of Search ...................... 239/265.33, 265.35, 239/265.37; 60/226.2, 230, 232; 244/12.5, 23 D, 52, 110 B

[56] References Cited

U.S. PATENT DOCUMENTS

| | | |
|---|---|---|
| 2,951,660 | 9/1960 | Giliberty . |
| 3,081,597 | 3/1963 | Kosin et al. ........................ 244/23 D |
| 4,000,610 | 1/1977 | Nash et al. ............................ 60/230 |
| 4,000,611 | 1/1977 | McCardle, Jr. et al. ...... 239/265.37 |
| 4,222,234 | 9/1980 | Adamson ............................ 60/230 |

FOREIGN PATENT DOCUMENTS 1541066 2/1979 United Kingdom .
1541065 2/1979 United Kingdom .
1550633 8/1979 United Kingdom .
1565026 4/1980 United Kingdom .

*Primary Examiner*—Andres Kashnikow
*Assistant Examiner*—Michael J. Forman
*Attorney, Agent, or Firm*—Parkhurst & Oliff

[57] ABSTRACT

A vectorable exhaust nozzle 17 for a gas turbine engine comprises a fixed duct 21 and a cowl 22 pivotably attached to the duct 21 to facilitate rotation of the cowl 22 about a horizontal axis transverse to the exhaust stream issuing from the duct 21. The nozzle 17 further comprises a flap 23 pivotably attached to the lower downstream edge of the duct 21 for rotation about a second horizontal axis transverse to the exhaust stream and an actuation means 28 for rotating the cowl 22 and flap 23. The cowl 22 and flap 23 communicate via at least one link member 24. The actuation means 28 rotates the cowl 22 which, by way of the link members 24, rotates the flap 23 in the same direction. The nozzle 17 defined by the sidewalls 22a and the interconnecting curved wall 22b of the cowl 22 and the downstream edge of the flap 23, is thus vectored from a direction facing rearwards to a direction facing downwards.

8 Claims, 4 Drawing Figures

VECTORABLE EXHAUST NOZZLE FOR GAS TURBINE ENGINES

BACKGROUND AND SUMMARY OF THE INVENTION

The invention relates to gas turbine engine exhaust nozzles, more particularly, an apparatus for exhaust deflection while maintaining a constant exhaust nozzle area of rectangular shape.

A desirable feature of modern aircraft is that the jet efflux may be deflected in a selected direction in order to achieve high maneuverability and vertical or short take-off and landing (V/STOL). The most note-worthy example is that employed by the Harrier's Rolls-Royce Pegasus engine.

The Rolls-Royce Pegasus engine utilizes four swivelling nozzles, two of which are placed toward the front of the aircraft on each side of the fuselage for the passage of by-pass air. The other two are located toward the rear of the aircraft for passing the hot efflux gases from the turbine. By rotating the nozzles from a direction pointing rearward to a position pointed downward, the thrust produced by the nozzles may be selectively directed respectively forward for cruise or upwards for vertical take-off and landing.

Instead of discharging the efflux of hot gases from the engine's turbine through a bifurcated jet pipe, and hence from two vectorable nozzles, it is also known to provide a single jet pipe with a vectorable nozzle to produce forwards or upwards directed thrust.

The invention, as claimed, seeks to provide a vectorable exhaust nozzle for a gas turbine engine in which the flow area is not varied as a direct result of vectoring the nozzle.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
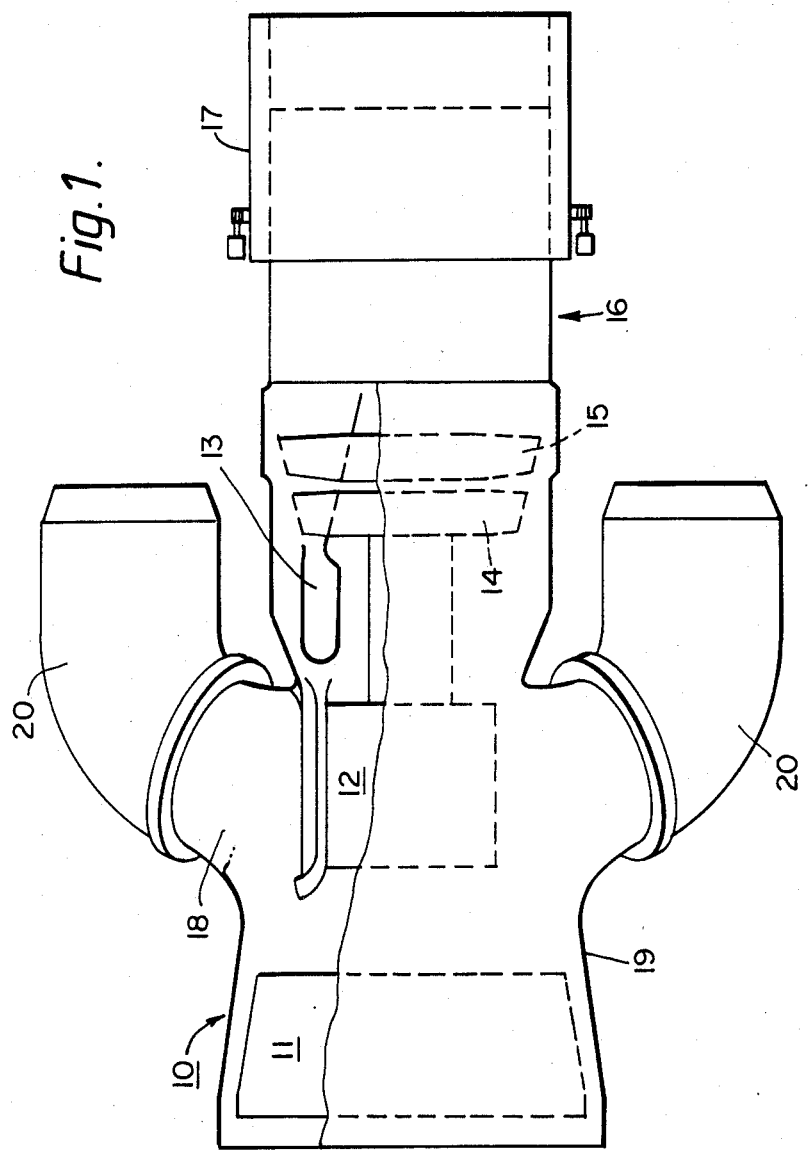
FIG. 1 illustrates schematically a plan view of a gas turbine engine fitted with a vectorable exhaust nozzle constructed in accordance with the present invention.

Referring to FIG. 1, there is shown a gas turbine aero engine 10 of the by-pass type. The engine comprises, in flow series, an axial flow low pressure compressor 11, an axial flow high pressure compressor 12, a combustion chamber 13, a high pressure turbine 14 which drives the H.P. compressor 12, a low pressure turbine 15 which drives L.P. compressor 11 and a jet pipe 16 terminating in a vectorable nozzle 17 constructed in accordance with the present invention.

The L.P. compressor 11 supplies compressed air to the H.P. compressor 12 and to a plenum chamber 18 which forms part of the by-pass duct 19 and which terminates in two vectorable nozzles 20.

Figure 2:
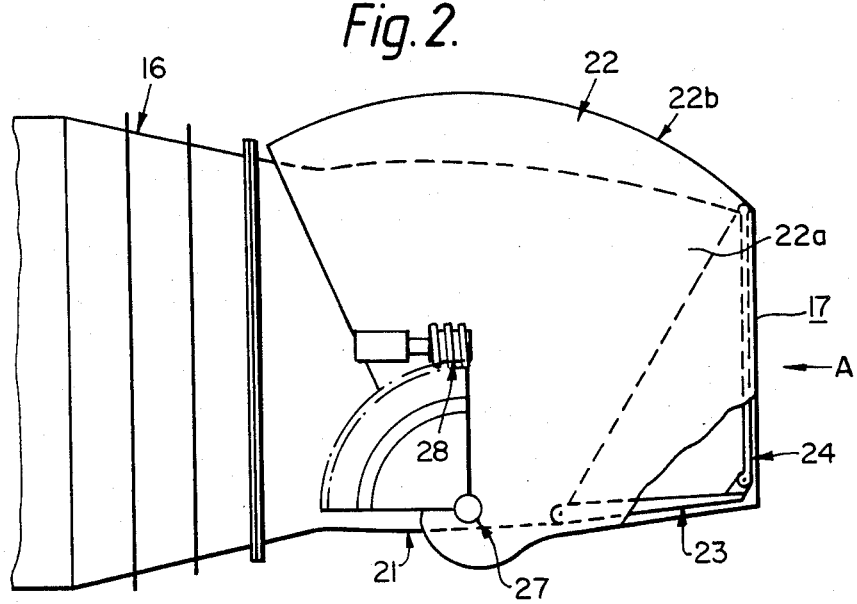
FIG. 2 illustrates a side view of the exhaust nozzle as described by the present invention.
Figure 3:
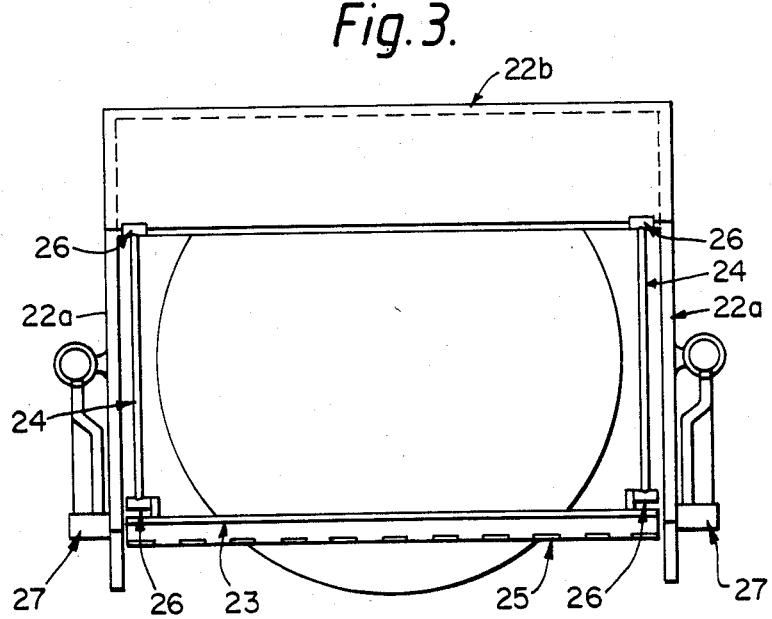
FIG. 3 illustrates the exhaust nozzle viewed on arrow A in FIG. 2.

Referring to FIGS. 2 and 3, the nozzle 17 comprises a fixed duct 21, a cowl 22 and a flap 23 connected to the cowl 22 by two link members 24. The cowl 22 comprises two side walls 22a and a curved deflector wall 22b that interconnects the side walls 22a. The fixed duct 21 is attached, in flow series, to the jet pipe 16 which is shaped so as to convert the flow of exhaust gas from a circular section to one of rectangular section. The downstream end of the fixed duct 21 is scarfed such that the lower downstream edge is nearer to the jet pipe 16 than the upper edge.

The flap 23 is connected to the lower edge of the fixed duct 21 at the downstream end by means of a hinge 25 such that the flap 23 may rotate about a first horizontal transverse axis located along the hinge 25. The flap 23 is of similar width to the fixed duct 21 and extends between the side walls 22a of the cowl 22.

The two link members 24 are located on the two corners of the flap 23 which are opposite to the hinge 25, and each link member 24 is mounted on a bearing 26 to allow rotation of the operating link 24 about that bearing 26 in a vertical plane parallel to the engine centreline. The other ends of the link members 24 are mounted in the same way to the cowl 22.

The cowl 22, which is slightly wider than the fixed duct 21, is mounted on two bearings 27 attached to each side of the fixed duct 21. The cowl 22 will, therefore, be able to rotate about a second horizontal transverse axis located upstream of the first transverse axis. The cowl 22 is shaped such that in all vectoring positions a close fit is preserved between the cowl 22 and the top downstream edge of the fixed duct 21, the two walls of the fixed duct 21 and the sides of the flap 23. Thus a nozzle is formed such that its exit is defined by a bottom side (the flap 23), two sides (the side walls 22a of the cowl 22) and a top side (the interconnecting deflector wall 22b of the cowl 22) or the roof of the fixed duct 21 when the nozzle is in the rearward pointing position.

The cowl 22 may be actuated by a worm and quadrant 28 or any suitable means such as a hydraulic ram. The centre of the quadrant coincides with the second transverse axis.

Figure 4:
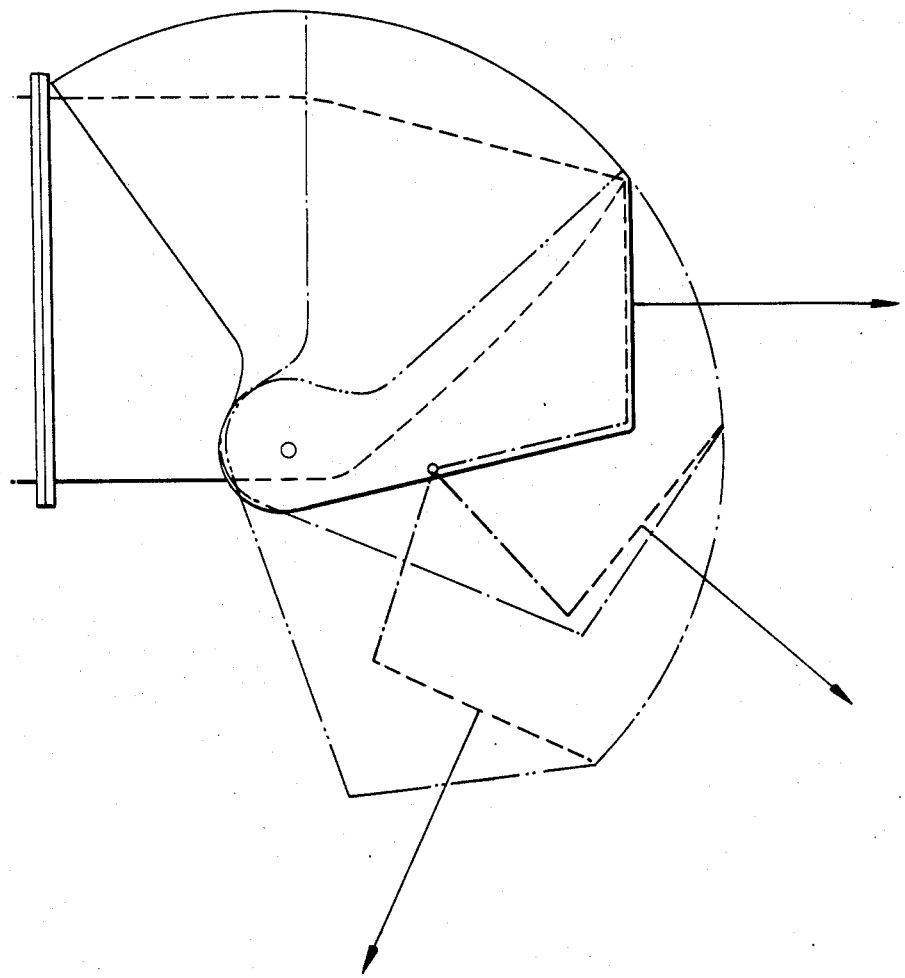
FIG. 4 depicts the exhaust nozzle schematically in various vectoring positions.

Referring to FIG. 4, the thrust may be selectively directed by rotating the cowl 22 about the second transverse axis and causing the flap 23 to rotate about the first transverse axis in the same direction by means of the link members 24. The distance between the downstream edge of the deflector wall 22b of the cowl 22 and the downstream edge of the flap 23 is kept constant by the link members 24, thus maintaining a constant nozzle exit area, during the vectoring movements. In FIG. 4, the cowl rotates from a first upstream position (shown in solid lines) to a second downstream deployed position (shown in phantom lines).

The relative locations of the first and second transverse axes are so chosen to ensure that in all vectored positions a smooth transition in direction of exhaust flow is achieved. In some circumstances placing the transverse axis about which the flap 23 rotates too far downstream will result in a convergent/divergent nozzle being formed in certain vectoring positions. Furthermore, placing the first axis too far upstream will, in most circumstances, increase the nozzle exit area because longer operating links 24 are required. If the links 24 become too long a divergent nozzle may result in some positions.

If desired, means which do not form part of this invention could be provided for varying the exit area of the nozzle independently of the vectoring movement of the nozzle.

Whilst the nozzle described in this specification is of rectangular section, it is possible to depart from this shape if desired.

I claim:

1. A vectorable exhaust nozzle for an exhaust gas stream in a gas turbine engine having an exhaust orifice, said nozzle comprising:
    a fixed structure including a fixed duct defining a longitudinal axis and having an upstream end and a downstream edge;
    a cowl pivotally attached to the fixed structure for rotation about an axis located upstream of said downstream edge and transverse to said longitudinal axis, said cowl comprising two sidewalls and a deflector wall extending therebetween;
    a flap pivotally attached to the downstream edge of the fixed duct and extending between the sidewalls of the cowl, said flap and said sidewalls of said cowl defining an area for the exhaust orifice;
    at least one link member pivotally attached at one end to said cowl and at an opposite end to said flap; and
    actuation means for pivoting one of said cowl and said flap and thereby simultaneously pivoting the other of said cowl and said flap through said at least one link member, said actuation means simultaneously pivoting said cowl and flap between a first upstream position and a second downstream deployed position to increasingly deflect the exhaust gas stream and maintain the area of said exhaust orifice substantially constant.

2. A nozzle as claimed in claim 1 wherein when the cowl is in the first upstream position the exhaust gas stream issues in a direction parallel to the longitudinal axis of the fixed duct and in the second deployed position the exhaust gas stream is deflected by the cowl more than 90° with respect to the longitudinal axis of the fixed duct.

3. A nozzle as claimed in claim 1 wherein the cowl deflector wall has a cross-section parallel to the cowl sidewalls in the form of an arc of a circle, a center of said circle being located on the transverse axis about which the cowl is rotatable; and a radius of said circle is substantially equal to the distance from said transverse axis of said cowl to an upper downstream edge of the fixed duct.

4. A nozzle as claimed in claim 1 wherein the exhaust orifice is rectangular.

5. A nozzle as claimed in claim 1 wherein the sidewalls of the cowl are pivotably attached to the fixed structure at a lower region of the fixed duct.

6. A nozzle as claimed in claim 1 wherein the flap includes an upstream edge adjacent said fixed duct, and a downstream edge, the downstream edge of the flap and the at least one link member being arranged in a plane perpendicular to the direction of the exhaust stream issuing from the nozzle.

7. A nozzle as claimed in claim 1 wherein the fixed duct is scarfed such that the edge to which the flap is attached is upstream of an edge of the fixed duct adjacent to the deflector wall.

8. A nozzle as claimed in claim 1 wherein the actuation means acts directly on the cowl and acts on the flap through the cowl and at least one link member.

* * * * *